United States Patent
Su et al.

(10) Patent No.: US 8,247,986 B2
(45) Date of Patent: Aug. 21, 2012

(54) POWER CONVERSION CONTROLLER HAVING AN ADAPTIVE PEAK CURRENT REFERENCE

(75) Inventors: Wei-Chuan Su, Taipei (TW); Ko-Yen Lee, Taipei (TW)

(73) Assignee: Immense Advance Technology Corp., Neihu District, Taipei (TW)

( * ) Notice: Subject to any disclaimer, the term of this patent is extended or adjusted under 35 U.S.C. 154(b) by 207 days.

(21) Appl. No.: 12/795,930

(22) Filed: Jun. 8, 2010

(65) Prior Publication Data

US 2011/0298390 A1 Dec. 8, 2011

(51) Int. Cl.
*H05B 41/16* (2006.01)

(52) U.S. Cl. ..... 315/247; 315/291; 315/224; 315/185 S; 315/276

(58) Field of Classification Search ............... 315/247, 315/224, 225, 291, 276–278
See application file for complete search history.

(56) References Cited

U.S. PATENT DOCUMENTS

2011/0175584 A1* 7/2011 Huber et al. ............. 323/282
* cited by examiner

*Primary Examiner* — Tuyet Thi Vo
(74) *Attorney, Agent, or Firm* — Shimokaji & Associates P.C.

(57) ABSTRACT

A power conversion controller having an adaptive peak current reference, including: a peak current reference generation means, used for generating a peak current reference signal by performing an adaptive arithmetic operation on an output voltage feedback signal and a power source signal; and a comparator means, used for generating a gating signal by performing a voltage comparison operation on the peak current reference signal and a current sensing signal.

9 Claims, 7 Drawing Sheets

POWER CONVERSION CONTROLLER HAVING AN ADAPTIVE PEAK CURRENT REFERENCE

BACKGROUND OF THE INVENTION

1. Field of the Invention

The present invention relates to a power conversion controller, and more particularly to a power conversion controller capable of providing constant load current control and power factor correction for power conversion applications.

2. Description of the Related Art

In power conversion applications utilizing AC power sources, power factors are often required to be as high as possible. Taking LED driver circuit as an example, when a LED module included in a LED driver circuit is powered by an AC power source, the power factor won't be good unless an appropriate power factor correction mechanism is applied to the LED driver circuit. To include power factor correction in the LED driver circuit, prior art used to adopt CV (Constant Voltage) architecture because it is common seen in switching power applications that power factor correction mechanisms are implemented in CV architectures.

FIG. 1 shows the architecture of a prior art CV (Constant Voltage) LED driver circuit. As shown in FIG. 1, CV function is mainly attained by a LED driver controller 100 and an isolation feedback network 110, wherein an error signal $V_{ERROR}$ is delivered by the isolation feedback network 110 to the LED driver controller 100, according to the difference between a DC reference voltage and a division of an output voltage $V_{OUT}$. The isolation feedback network 110 is typically implemented with a photo-coupler circuit and a programmable shunt regulator. To simultaneously attain CV and power factor correction, the peak value of a current sensing signal $V_{CS}$ is designed to follow the product of $V_D$—a division of a line voltage $V_{IN}$—and the $V_{ERROR}$, wherein $V_{CS}$ represents the current flowing through the primary side of a transformer. In steady state, $V_{ERROR}$ will approach a constant, a rated $V_{OUT}$ is provided thereby; and the peak value of the current flowing through the primary side will follow the line voltage $V_{IN}$ to exhibit a good power factor.

However, since the current-voltage characteristic of LED is of exponential function, a slight voltage variation can cause a large variation of current, resulting in unstable illumination. Therefore, CV is not suitable for application requiring constant load current—such as the LED driver circuit, and there is a need to provide a power conversion circuit including power factor correction in CC (Constant Current) architecture.

In view of this problem, the present invention proposes a novel power conversion controller having an adaptive peak current reference, to not only provide a constant average current, but also correct the power factor.

SUMMARY OF THE INVENTION

The primary objective of the present invention is to propose a power conversion controller for a power conversion circuit, to provide a constant average current insensitive to line voltage variations.

Another objective of the present invention is to propose a power conversion controller for a power conversion circuit, to provide a constant average current insensitive to output voltage variations on the load.

Still another objective of the present invention is to propose a power conversion controller for a power conversion, to provide a constant average current irrespective of the transformer design of the power conversion circuit.

Still another objective of the present invention is to propose a power conversion controller for a power conversion circuit, to provide excellent power factor irrespective of line voltage variations.

To achieve the foregoing objectives of the present invention, a novel power conversion controller having an adaptive peak current reference is proposed, the power conversion controller including: a peak current reference generation means, used for generating a peak current reference signal by performing an adaptive arithmetic operation on an output voltage feedback signal and a power source signal; and a comparator means, used for generating a gating signal by performing a voltage comparison operation on the peak current reference signal and a current sensing signal.

The power conversion controller of the present invention therefore offers some advantages:

1. The average current provided for the load is constant and insensitive to line voltage variations.
2. The average current provided for the load is constant and irrespective of the output voltage of the load.
3. The average current provided for a load is constant and irrespective of the transformer design—inductance, turns ratio, etc.
4. An excellent power factor is achieved irrespective of line voltage variations.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
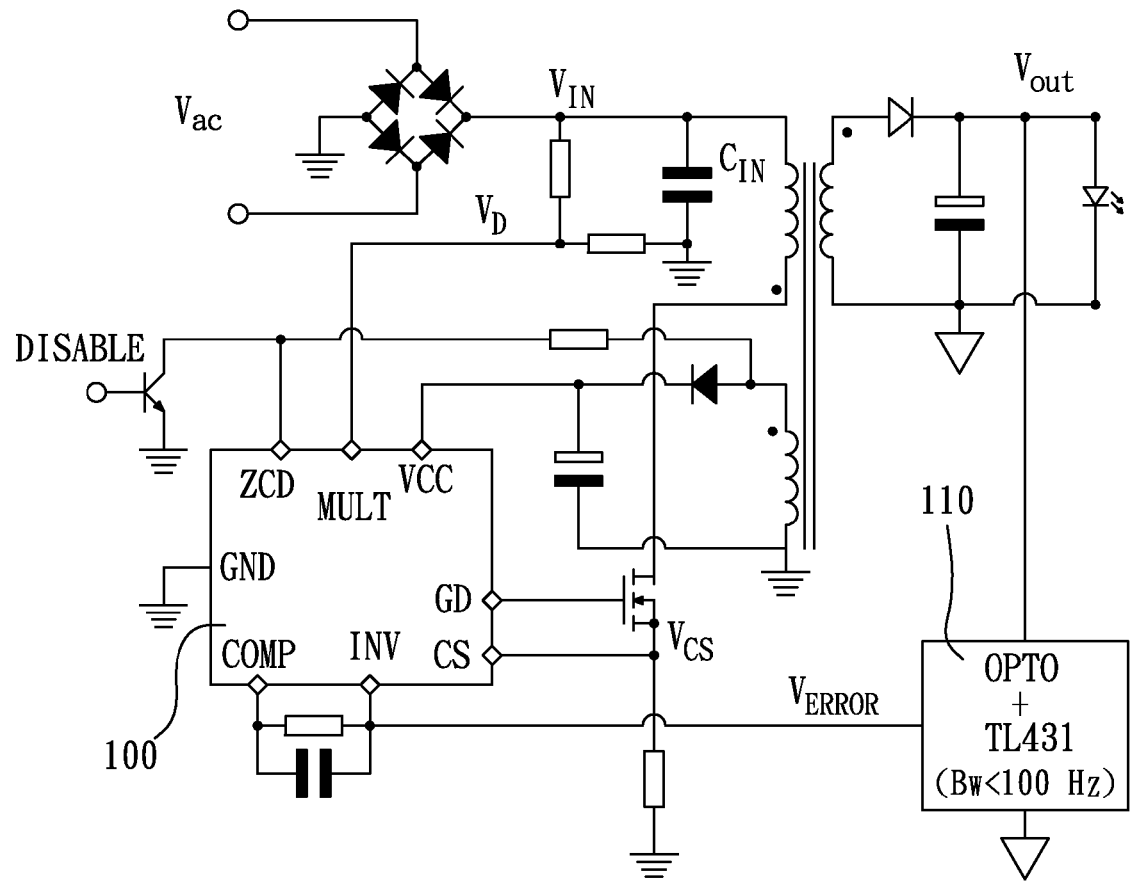
FIG. 1 is the architecture of a prior art CV (Constant Voltage) LED driver circuit.
Figure 2:
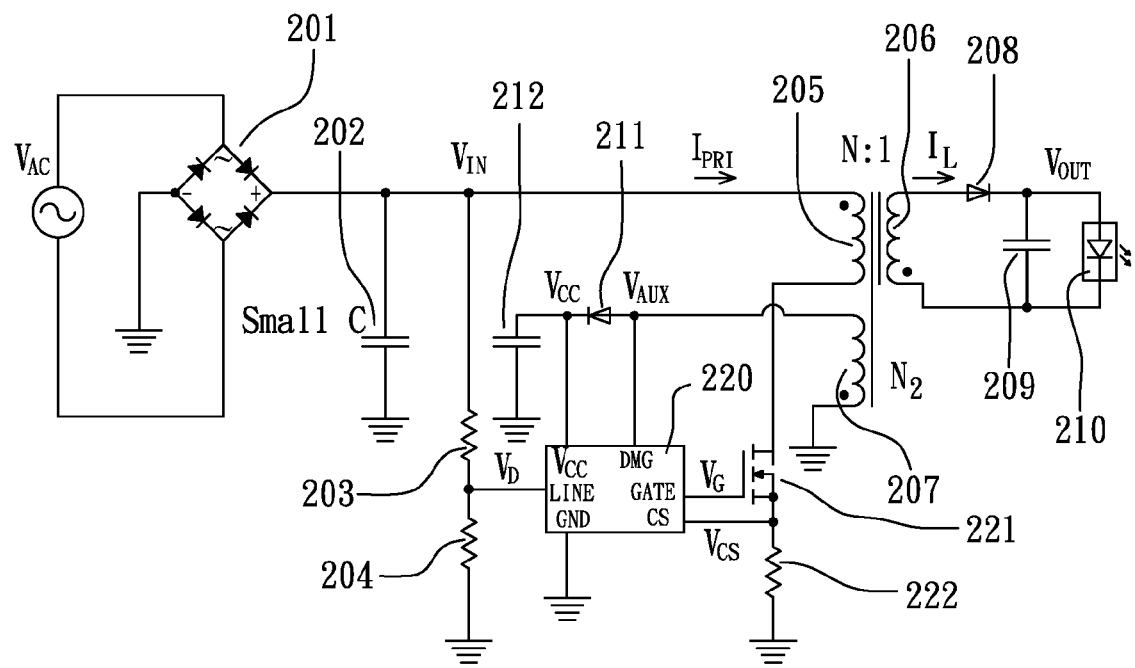
FIG. 2 is the architecture of a CC (Constant Current) LED driver circuit utilizing a power conversion controller according to a preferred embodiment of the present invention.

Please refer to FIG. 2, which shows the architecture of a CC (Constant Current) LED driver circuit utilizing a power conversion controller according to a preferred embodiment of the present invention. As shown in FIG. 2, the LED driver circuit includes a bridge regulator 201, a filtering capacitor 202, voltage division resistors 203~204, a primary coil 205, a secondary coil 206, an auxiliary coil 207, a regulation diode 208, a filtering capacitor 209, a LED module 210, a regulation diode 211, a filtering capacitor 212, a power conversion controller 220, an NMOS transistor 221, and a current sensing resistor 222.

The bridge regulator 201 is used to perform a full-wave regulation on an AC power source $V_{AC}$ to generate a line voltage $V_{IN}$, of which the period is half of that of the AC power source $V_{AC}$.

The filtering capacitor 202 is preferably a small capacitor, used to filter out the high frequency noise.

The voltage division resistors 203~204, biased between the line voltage $V_{IN}$ and a reference ground, are used to generate a power source signal $V_D(=B_1 \times V_{IN})$.

The primary coil 205, coupled to the line voltage $V_{IN}$, is used to receive the input energy and store it in a magnetic core when the primary side current path—controlled by the NMOS transistor 221—is on. The secondary coil 206, of which the number of turns is 1/N of that of the primary coil 205, is used to deliver a secondary side current $I_L$ when the primary side current path is off. The auxiliary coil 207, of which the number of turns is $N_2$ times of that of the secondary coil 206, is used to generate a DC supply voltage $V_{CC}$ for the power conversion controller 220, and an output voltage feedback signal $V_{AUX}$, which is equal to $N_2 V_{OUT}$, when the primary side current path is off.

The regulation diode 208 is used to act as a unilateral switch and the filtering capacitor 209 is used to hold the output voltage $V_{OUT}$.

The LED module 210 is used as the load, and the value of the output voltage $V_{OUT}$ is determined by the number of LEDs contained in the LED module 210.

The regulation diode 211 and the filtering capacitor 212 are used to generate the DC supply voltage $V_{CC}$.

The power conversion controller 220, supplied by the supply voltage $V_{CC}$, is used to generate an adaptive peak current reference signal by performing an adaptive arithmetic operation on $V_D$ and $V_{AUX}$, and then generate a gating signal $V_G$ by comparing a current sensing signal $V_{CS}$—which represents the primary side current—with the adaptive peak current reference signal, to produce a constant average current for the LED module 210.

The NMOS transistor 221, driven by the gating signal $V_G$, is used as a power switch in the primary side current path. The resistor 222 is used to generate the current sensing signal $V_{CS}$ according to a primary side current $I_{PRI}$.

Figure 3:
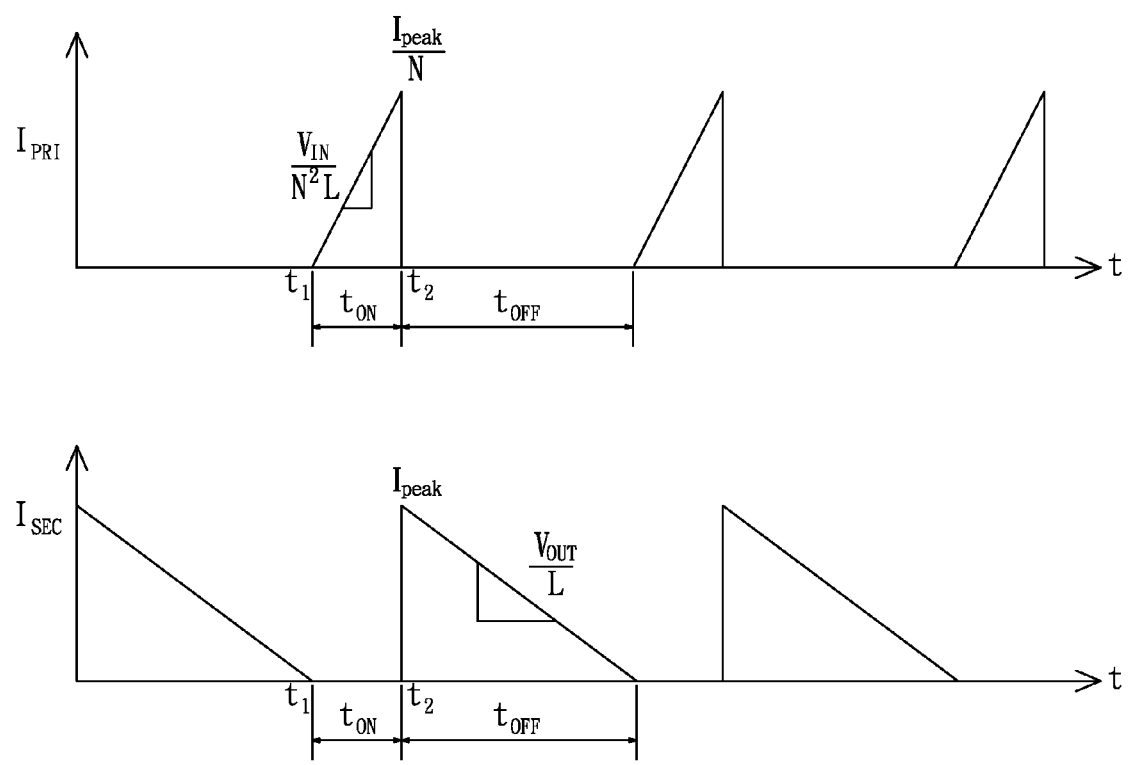
FIG. 3 is a waveform diagram of the secondary side current in the CC LED driver circuit of FIG. 2.

The principle of the power conversion controller 220 is illustrated as follows:

When the circuit is operating in boundary mode, as can be seen in FIG. 3, the primary side current $I_{PRI}$ starts to increase at $t_1$ with a slope $V_{IN}/N^2 L$ when the secondary side current $I_L$ decreases to zero, and the secondary side current $I_L$ starts to decrease at $t_2$ with a negative slope $V_{OUT/L}$ when the primary side current reaches $I_{PEAK/N}$. The average current of the secondary side current $I_L$ can be expressed as $I_{AVG}=(t_{OFF} \times I_{PEAK})/(2 \times (t_{ON}+t_{OFF}))=(V_{IN} \times I_{PEAK})/(2 \times (V_{IN}+NV_{OUT}))$. Therefore, if $I_{AVG}$ is to be a constant value $I_{CONST}$, then $I_{PEAK}$ should be determined according to the equation:

$$I_{PEAK}=I_{CONST} \times (V_{IN}+NV_{OUT})/V_{IN}.$$

Figure 4:
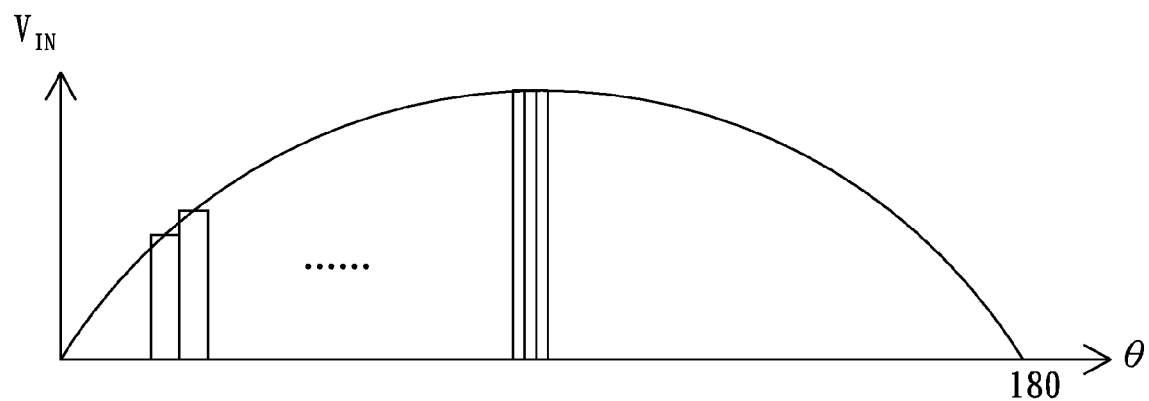
FIG. 4 is an illustrative diagram showing the relation between the switching period of the power MOSFET and the phase of the line voltage in the CC LED driver circuit of FIG. 2.

Since the line voltage $V_{IN}=V_{IN,MAX} \times \sin \theta$ has different levels at different angle values of $\theta$, to attain a constant average current, the switching period of the NMOS transistor 221 is prolonged/shortened when $V_{IN}$ becomes lower/higher, as shown in FIG. 4.

If the LED driver circuit is to have a unity power factor (PF=1)—average line current is in phase with line voltage, then the power delivered to the power conversion circuit will be proportional to $\sin^2 \theta$. Further, as the power delivered to the LED module 210 can be expressed as $LI_{PEAK}^2/(2 \times (t_{ON}+t_{OFF}))=(V_{IN} \times NV_{OUT} \times I_{PEAK})/(2 \times (V_{IN}+NV_{OUT}))$, if the power factor is expected to be unity—i.e. $(V_{IN} \times NV_{OUT} \times I_{PEAK})/(2 \times (V_{IN}+NV_{OUT}))$ is expected to be proportional to $\sin^2 \theta$, then $I_{PEAK}$ should be set proportional to $\sin^2 \theta \times (V_{IN}+NV_{OUT})/(V_{IN} NV_{OUT})$. Since $NV_{OUT}$ is a constant for a specific design, the equation for $I_{PEAK}$ can be simplified as $I_{PEAK}=A^2 \sin \theta \times (V_{IN}+NV_{OUT})/V_{IN}$, wherein A is a constant. What is amazing is that:

As $I_{PEAK}=I_{CONST} \times (V_{IN}+NV_{OUT})/V_{IN}$ is the formula for obtaining constant average current of the secondary side current $I_L$, the formula $I_{PEAK}=A^2 \sin^2 \theta \times (V_{IN}+NV_{OUT})/V_{IN}$ can result in not only an excellent power factor (ideally equal to 1), but also corresponding constant average values of the secondary side current $I_L$ for different angle values of $\theta$ (from 0 to 180 degrees), and thereby a constant mean of the constant average values of the secondary side current $I_L$.

To facilitate the implementation of $I_{PEAK}$, the equation for $I_{PEAK}$ can be further simplified as $I_{PEAK}=V_A \sin \theta \times (V_A \sin \theta + B_2 B_1 NV_{OUT})=V_A \sin \theta \times (V_A \sin \theta + B_2 K V_{AUX})$, wherein $B_1=KN_2/N=V_D/V_{IN}$, $B_2=V_A/B_1 V_{IN,MAX}$, $V_A$ is a DC voltage, K is a constant, and $N_2$ is a turn ratio between auxiliary coil and secondary coil.

As a preferred embodiment, the adaptive arithmetic operation for implementing $I_{PEAK}$ equation includes:

1. Adaptive multiplication operation, including: (1). an auto gain control amplification, which amplifies the power source signal $V_D(=B_1 V_{IN})$ with an adaptive gain $B_2(=V_A/B_1 V_{IN,MAX})$ to generate $V_A \sin \theta$. That is, auto adjusting the gain such that it equals to $B_2(=V_A/B_1 V_{IN,MAX})$ during the amplification of $V_D$, to have the resulted amplitude equal to $V_A$. (2) amplifying an output voltage feedback signal $KV_{AUX}$ with the adaptive gain $B_2$ to obtain $B_2 KV_{AUX}$.

2. Combination operation: adding $V_A \sin \theta$ and $B_2 KV_{AUX}$ to get a sum signal $(=V_A \sin \theta + B_2 KV_{AUX})$.

3. Multiplication operation: multiplying $V_A \sin \theta$ with $(V_A \sin \theta + B_2 KV_{AUX})$ to get the adaptive peak current reference signal $(=V_A \sin \theta \times (V_A \sin \theta + B_2 KV_{AUX}))$.

According to the specification of the adaptive arithmetic operation, an adaptive multiplication unit can be utilized to generate the constant amplitude signal $V_A \sin \theta$ by multiplying the power source signal $V_D=B_1 V_{IN,MAX} \times \sin \theta$ with an adaptive gain $B_2=V_A/B_1 V_{IN,MAX}$, which is inversely proportional to $V_{IN,MAX}$—the amplitude of $V_{IN}$; and multiply the output voltage feedback signal $KV_{AUX}$ with $B_2$ to generate $B_2 KV_{AUX}$. After $V_A \sin \theta$ and $B_2 KV_{AUX}$ are generated, an adder means and a multiplication means can be used to complete the formula and thereby produce a voltage signal representing the adaptive peak current reference $I_{PEAK}$.

The gating signal $V_G$ is then generated by comparing the current sensing signal $V_{CS}$ with the voltage signal representing the adaptive peak current reference $I_{PEAK}$, to make the average value of the load current $I_L$ approach a constant, and the peak value of the current flowing through the primary side follow the line voltage $V_{IN}$ to exhibit an excellent power factor.

Figure 5:
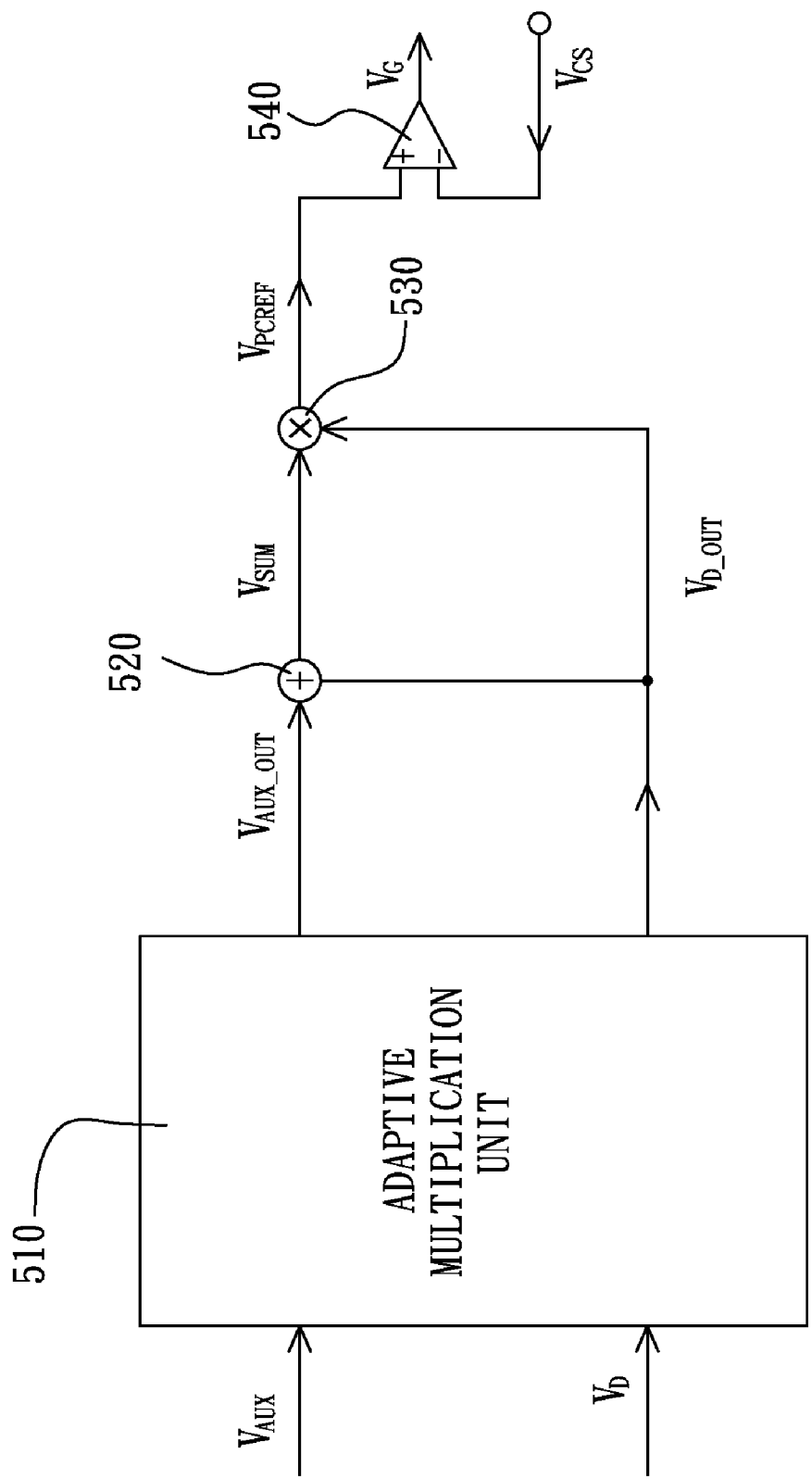
FIG. 5 is the block diagram of the power conversion controller according to a preferred embodiment of the present invention.

Please refer to FIG. 5, which shows the block diagram of the power conversion controller 220 according to a preferred embodiment of the present invention. As shown in FIG. 5, the controller includes an adaptive multiplication unit 510, an adder 520, a multiplier 530, and a comparator 540.

The adaptive multiplication unit 510, the adder 520, and the multiplier 530 are used to implement the adaptive arithmetic operation specified above. The adaptive multiplication unit 510 is used to perform the adaptive multiplication, which is specified above, on $V_{AUX}$—the output voltage feedback signal, and $V_D$—the power source signal, to generate $V_{AUX\_OUT}(=B_2KV_{AUX})$ and $V_{D\_OUT}(=V_A \sin \theta)$. The adder 520 is used to combine $V_{AUX\_OUT}$ and $V_{D\_OUT}$ to generate a sum signal $V_{SUM}$. The multiplier 530 is used to multiply $V_{SUM}$ with $V_{D\_OUT}$ to generate an adaptive peak current reference signal $V_{PCREF}$.

The comparator 540 is used to compare $V_{CS}$ with $V_{PCREF}$ to generate $V_G$. When $V_{CS}$, arising from the reference ground, reaches $V_{PCREF}$, $V_G$ will change state from high to low.

Figure 6:
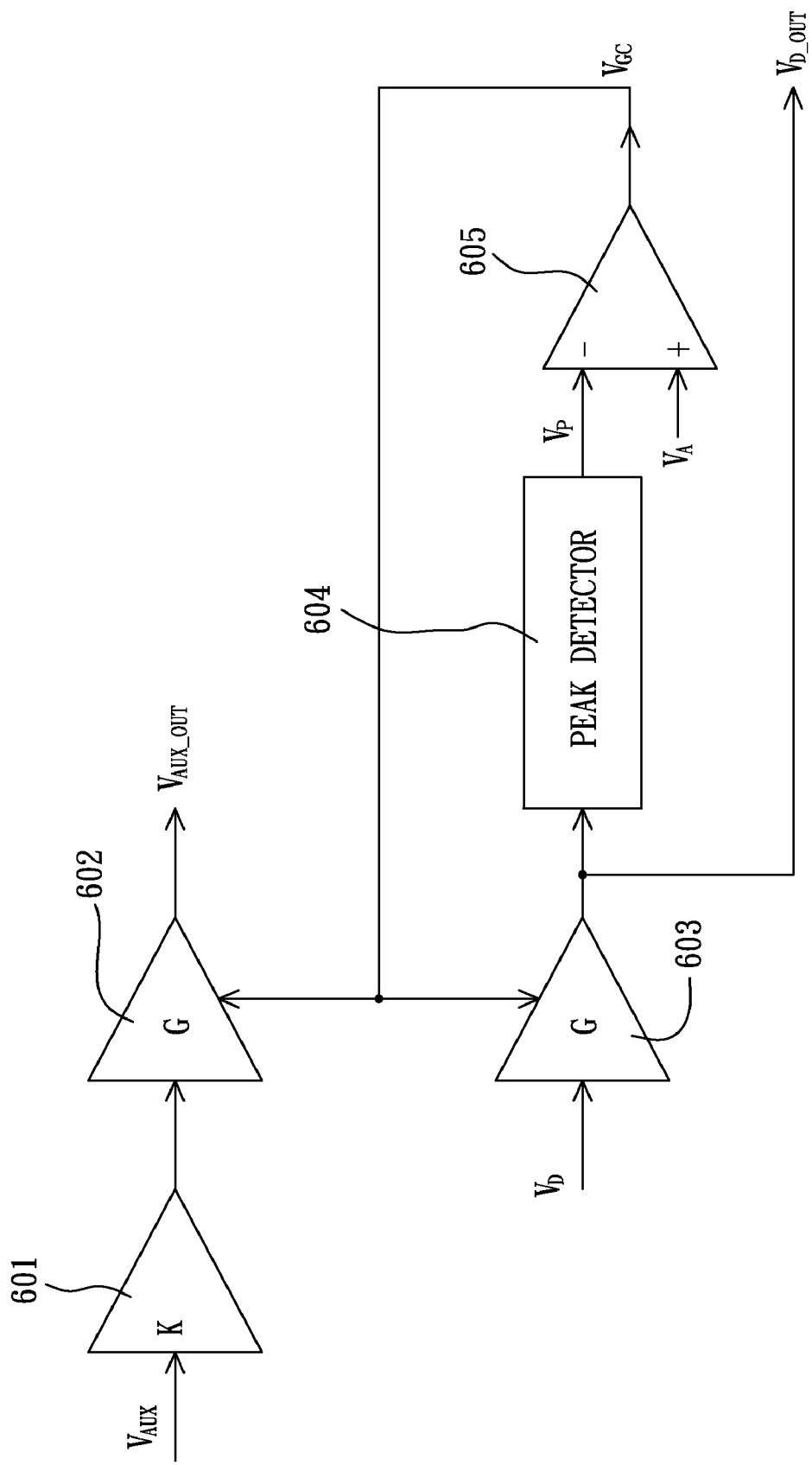
FIG. 6 is the detailed block diagram of the adaptive multiplication unit of the power conversion controller in FIG. 5 according to a preferred embodiment of the present invention.

The adaptive multiplication unit 510 can be implemented either with an analog circuit or a digital based circuit. Please refer to FIG. 6, which shows the detailed block diagram of the adaptive multiplication unit 510 implemented with an analog circuit according to a preferred embodiment of the present invention. As shown in FIG. 6, the circuit includes an amplifier 601, variable gain amplifiers 602~603, a peak detector 604, and an amplifier 605.

The amplifier 601 is used to amplify $V_{AUX}$ with a gain K. It is to be known that this amplification can also be implemented outside the controller, or partially inside, partially outside.

The variable gain amplifier 602 is used to amplify the output signal of the amplifier 601 with a gain, which is controlled by a gain control signal $V_{GC}$, to generate $V_{AUX\_OUT}$—a scaled version of $V_{AUX}$. The variable gain amplifier 603 is used to amplify $V_D$ with a gain, which is also controlled by the gain control signal $V_{GC}$, to generate $V_{D\_OUT}$—a scaled version of $V_D$.

The peak detector 604 is used to generate a peak signal $V_P$ representing the peak voltage of $V_{D\_OUT}$.

The amplifier 605 is used to generate the gain control signal $V_{GC}$ by amplifying the difference of $V_P$ and a DC voltage $V_A$.

Due to the virtual short of the input ends of the amplifier 605 in negative feedback configuration, $V_P$ is to approach $V_A$, and then $V_{D\_OUT}=V_A \sin \theta$, and G=the adaptive gain $B_2=V_A/(B_1 \times V_{IN,MAX})$.

Figure 7:
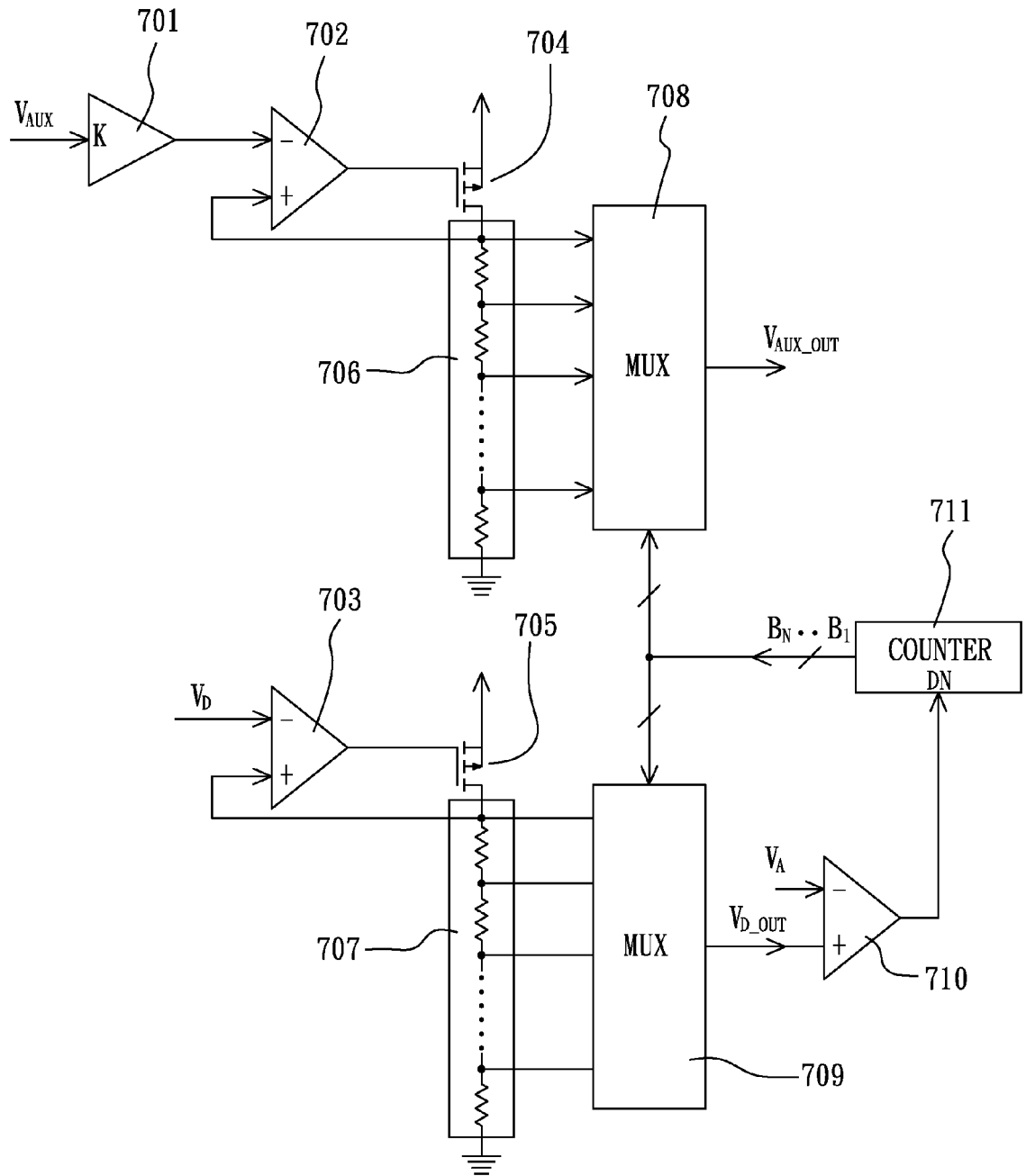
FIG. 7 is the detailed block diagram of the adaptive multiplication unit of the power conversion controller in FIG. 5 according to another preferred embodiment of the present invention.

FIG. 7 shows the detailed block diagram of the adaptive multiplication unit 510 implemented with a digital based circuit according to a preferred embodiment of the present invention. As shown in FIG. 7, the circuit includes amplifiers 701~703, PMOS transistors 704~705, resistive networks 706~707, multiplexers 708~709, a comparator 710, and a counter 711.

The amplifier 701 is used to amplify $V_{AUX}$ with a gain K. It is to be known that this amplification can also be implemented outside the controller, or partially inside, partially outside.

The amplifier 702, the PMOS transistor 704, and the resistive network 706 are used to perform a buffer-and-scale operation, wherein the amplifier 702 and the PMOS transistor 704 are used as a unity gain buffer, and the resistive network 706 is used to provide scaled versions of $KV_{AUX}$.

The amplifier 703, the PMOS transistor 705, and the resistive network 707 are used to perform a buffer-and-scale operation, wherein the amplifier 703 and the PMOS transistor 705 are used as a unity gain buffer, and the resistive network 707 is used to provide scaled versions of $V_D$.

The multiplexer 708 is used to connect one of the scaled versions of $KV_{AUX}$ to the output $V_{ADX\_OUT}$, under control of digital signals from the counter 711.

The multiplexer 709 is used to connect one of the scaled versions of $V_D$ to the output $V_{D\_OUT}$, under control of N-bits digital signals from the counter 711.

The comparator 710 is used to compare $V_{D\_OUT}$ with a DC voltage $V_A$ to generate a down-count signal for the counter 711.

The counter 711 is used to generate the N-bits digital signals according to the down-count signal input at DN pin.

The principle of the circuit in FIG. 7 is that:

When the peak of $V_{D\_OUT}$ is higher than $V_A$, the down-count signal will trigger the counter 711 to decrease the count number and thereby reduce the peak of $V_{D\_OUT}$. This process continues until the peak of $V_{D\_OUT}$ becomes lower than $V_A$, and at that instant, $V_{D\_OUT}=V_A \sin \theta$, and $V_{AUX\_OUT}=B_2KV_{AUX}$, wherein $B_2$ is the gain of the selected scaled version of $V_D$ over $V_D$.

As can be seen from the specification above, through the implementation of the adaptive peak current reference in a power conversion controller, the LED driver circuit—one of the applications of the present invention that require both constant load current and power factor correction—can simultaneously attain excellent power factor and constant average LED current, irrespective of line voltage variations, output voltage variations, and transformer design varieties, so the present invention does improve the prior art circuits and is worthy of being granted a patent.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A power conversion controller having an adaptive peak current reference, used for implementing a power conversion circuit, the controller comprising:
    a peak current reference generation means, adapted to generate a peak current reference signal by performing an adaptive arithmetic operation on an output voltage feedback signal and a power source signal, wherein the peak current reference generation means comprises an adaptive multiplication means, used for generating a first scaled signal and an adaptive gain by performing an auto gain control amplification on said power source signal, and generating a second scaled signal by amplifying said output voltage feedback signal with said adaptive gain; and
    a comparator means, adapted to generate a gating signal by performing a voltage comparison operation on said peak current reference signal and a current sensing signal.

2. The power conversion controller having an adaptive peak current reference as claim 1, wherein said power conversion circuit is a LED driver circuit.

3. The power conversion controller having an adaptive peak current reference as claim 1, wherein said peak current reference generation means comprises:
    an adder means, used for generating a sum signal by adding said first scaled signal and said second scaled signal; and
    a multiplication means, used for generating said peak current reference signal by multiplying said sum signal with said first scaled signal.

4. The power conversion controller having
    an adaptive peak current reference as claim 1, wherein said adaptive multiplication means comprises:

a first variable gain amplification means, used for generating said first scaled signal by amplifying said power source signal with said adaptive gain, said adaptive gain being determined by a gain control signal;

a peak detection means, used for generating a peak voltage of said first scaled signal;

an amplification means, used for generating said gain control signal by amplifying the difference of a DC voltage and said peak voltage; and a second variable gain amplification means, used for generating said second scaled signal by amplifying said output voltage feedback signal with said adaptive gain.

5. The power conversion controller having an adaptive peak current reference as claim 1, wherein said adaptive multiplication means comprises:

a first buffer means, used for generating a first set of signals by performing a buffer-and-scale operation on said power source signal;

a first multiplexer means, used for providing said first scaled signal by performing a multiplexing operation on said first set of signals;

a counter means, used for generating a plurality of digital signals to control said multiplexing operation by performing a count down operation;

a comparator means, used for generating a count down signal to control said count down operation by performing a voltage comparison operation on said first scaled signal and a DC voltage;

a second buffer means, used for generating a second set of signals by performing a buffer-and-scale operation on said output voltage feedback signal; and a second multiplexer means, used for providing said second scaled signal by performing a multiplexing operation on said second set of signals, under control of said plurality of digital signals.

6. The power conversion controller having an adaptive peak current reference as claim 5, wherein said first buffer means comprises a unit-gain amplifier and a plurality of resistors in series connection.

7. The power conversion controller having an adaptive peak current reference as claim 5, wherein said second buffer means comprises a unit-gain amplifier and a plurality of resistors in series connection.

8. A LED driver controller having an adaptive peak current reference, comprising:

an adaptive multiplication means, used for generating a first scaled signal and an adaptive gain by performing an auto gain control amplification on a power source signal, and generating a second scaled signal by amplifying an output voltage feedback signal with said adaptive gain;

an adder means, used for generating a sum signal by adding said first scaled signal and said second scaled signal;

a multiplication means, used for generating a peak current reference signal by multiplying said sum signal with said first scaled signal; and a first comparator means, used for generating a gating signal by performing a voltage comparison operation on said peak current reference signal and a current sensing signal.

9. A LED driver controller having an adaptive peak current reference, comprising:

a first buffer means, used for generating a first set of signals by performing a buffer-and-scale operation on a power source signal;

a first multiplexer means, used for providing a first scaled signal by performing a multiplexing operation on said first set of signals;

a counter means, used for generating a plurality of digital signals to control said multiplexing operation by performing a count down operation;

a second comparator means, used for generating a count down signal to control said count down operation by performing a voltage comparison operation on said first scaled signal and a DC voltage;

a second buffer means, used for generating a second set of signals by performing a buffer-and-scale operation on an output voltage feedback signal;

a second multiplexer means, used for providing a second scaled signal by performing a multiplexing operation on said second set of signals, under control of said plurality of digital signals;

an adder means, used for generating a sum signal by adding said first scaled signal and said second scaled signal;

a multiplication means, used for generating a peak current reference signal by multiplying said sum signal with said first scaled signal; and a first comparator means, used for generating a gating signal by performing a voltage comparison operation on said peak current reference signal and a current sensing signal.

* * * * *